United States Patent [19]

Breil

[11] Patent Number: 4,701,149

[45] Date of Patent: Oct. 20, 1987

[54] METHOD AND APPARATUS FOR BICYCLE NOISE MAKING SYSTEM

[76] Inventor: James J. Breil, 701 Marilyn, Glendale Heights, Ill. 60139

[21] Appl. No.: 910,378

[22] Filed: Sep. 22, 1986

[51] Int. Cl.$^4$ .............................................. A63H 5/00
[52] U.S. Cl. ..................................... 446/404; 24/306; 24/442; 446/901
[58] Field of Search ............... 446/404, 418, 397, 901, 446/220, 222; 280/289 D, 289 R, 1.14; 24/306, 442

[56] References Cited

U.S. PATENT DOCUMENTS

| | | | |
|---|---|---|---|
| 2,736,136 | 2/1956 | Modlin | 446/404 |
| 2,748,532 | 6/1956 | Gergovich et al. | 446/404 X |
| 3,097,447 | 7/1963 | Peham et al. | 446/404 |
| 3,472,198 | 10/1969 | Rinecker | 24/442 X |
| 3,782,030 | 1/1974 | Gergovich | 446/404 |
| 3,841,648 | 10/1974 | Meyer | 24/306 |
| 3,905,151 | 9/1975 | Zweigle | 446/404 |
| 3,947,927 | 4/1976 | Rosenthal | 24/306 |

Primary Examiner—Philip C. Kannan
Attorney, Agent, or Firm—William J. Michals

[57] ABSTRACT

A simulated motor-sound producer for attachment to a frame member of a bicycle includes a toy balloon having a bulbous central portion positionable in the path of travel of the revolving spokes of the bicycle's wheel. The balloon is secured to the bicycle frame member by a pair of flexible, generally elongate straps wrapped around the frame member and end projections of the balloon. Each strap has a first side which comprises first hook and loop securement means and a second side having a frame engaging member and second hook and loop securement means. The frame engaging member of the strap has a reversely bent terminal end portion, the bight of which receives one of the end projections of the balloon. Further, the frame engaging member comprises a band of non-slip material which prevents relative movement between the strap and frame member. A method for attaching the balloon the the frame member includes the steps of positioning each end projection of the balloon within the bight of the reversely bent end of the frame engaging member, after which such end is manually compressed against the frame member as the strap is wrapped therearound. As the first and second hook and loop securement means are thereby brought into registry with one another they are pressed together whereby the balloon end projection is firmly secure to the frame member.

4 Claims, 4 Drawing Figures

METHOD AND APPARATUS FOR BICYCLE NOISE MAKING SYSTEM

BACKGROUND OF THE INVENTION

1. Field of the Invention

The present invention relates to a method and apparatus for simulating the sound of an internal combustion engine by means of a balloon positioned in the path of the revolving spokes of a bicycle wheel and, it relates more particularly to an improved mounting means and method whereby the balloon is securely fixed to the frame of the bicycle without risk of damage to the bicycle or harm to the rider.

2. Description of the Prior Art

Young people have long enjoyed the novelty of attaching various noise making devices to their bicycles to simulate the exhaust sounds of an internal combustion engine. Typically, the noise producing device is mounted to the frame of the bicycle in proximity to the spokes of the bicycle wheel, whereupon the spokes strike the noise making device as they revolve, thereby creating the desired engine-like sound. An example of a noise making device of the foregoing type is disclosed in U.S. Pat. No. 2,736,136 issued to Modlin on Feb. 28, 1956, which teaches the use of a bracket member attached to the frame of a bicycle for holding a playing card in line with the path of travel of the bicycle wheel spokes. In another form, as disclosed by the patent to Peham, et. al., U.S. Pat. No. 3,097,447 issued July 16, 1963, the noise maker may consist of a flexible reed mounted to the frame of the bicycle and extending into the path of travel of the wheel spokes. In either of the foregoing examples, the repetitive striking of the card, or reed, by the spokes creates a sound which varies in intensity and pitch with the angular velocity of the wheel, lending the illusion that the bicycle is powered by an internal combustion engine.

While devices of the foregoing type function effectively to generate noises of varying tones and intensities, young people often prefer to use a toy balloon to create engine-like sounds by its interaction with the spokes of a bicycle wheel. Unlike reeds or playing cards, a toy balloon offers the advantages of producing a much louder, hollower tone more closely approximating the muffled exhaust sounds of an internal combustion engine. To facilitate the mounting of the balloon in proximity to the revolving spokes of the bicycle wheel, numerous devices are known. For example, Gergovich, et al., U.S. Pat. No. 2,748,532 issued June 5, 1956 disclose an arrangement whereby a balloon is mounted to the frame of a bicycle by means of a rigid bracket member which is afixed to the bicycle frame by taping. Yet another arrangement is 20 disclosed in Gergovich, U.S. Pat. No. 3,782,030 issued Jan. 1, 1974 wherein the balloon is supported from a yoke-like wire member which, in turn, is attached to the axle of the bicycle wheel.

Each of the foregoing devices is not without disadvantage. In the case of playing card or reed-type noise making devices, sound intensities and tones of a preferred level, as heretofore discussed, are not likely to be generated. Where balloon-type systems are employed, heretofore known mounting arrangements typically involve the use of relatively expensive or complicated apparatus, making these systems unaffordable or unmanageable for use by the younger bicyclist. Yet another disadvantage of heretofore known noise making systems resides in their reliance on metallic or other rigid mounting structures which can accidentally detach from the bicycle frame and jam in the wheel spokes thereby risking both damage to the bicycle and possible harm to the rider. The use of rigid mounting structures for balloon-type noise makers are particularly disadvantageous in that they can impose stress concentrations on the somewhat fragile balloon leading to its premature failure.

Accordingly, it would be desirable to reduce the material and assembly costs of known bicycle noise maker devices, whereby a device of such type can be more economically manufactured and sold at a less expensive price. It would be further desirable to provide a balloon-type noise maker mounting structure which does not involve the use of rigid components, whereupon the life of the balloon is extended and risk of damage to the bicycle or injury to the bicyclist is completely avoided.

SUMMARY OF THE INVENTION

Briefly, there is provided in accordance with the teachings of the present invention a new and improved method and apparatus for securely fastening a toy balloon to the frame of a bicycle in proximity to the revolving spokes of the bicycle wheel whereby simulated engine-like noise can be generated. The invention is accomplished through the provision of a novel device cooperable with end projections of the balloon to secure the ends of the balloon to the bicycle frame. The instant device comprises a flexible, generally elongate strap having two oppositely facing sides. One side of the strap comprises first hook and loop securement means. The other side of the strap comprises two surface members, one of which is a second hook and loop securement means and the other of which is a frame engaging band member. The frame engaging band member is flexible, generally elongate and adapted for non-slip engagement with the frame member of a bicycle.

Further, the present invention is directed to a method for securing a balloon to a frame member of a bicycle, wherein the balloon has a bulbous central portion and a pair of projections defined at opposite ends thereof. The instant method is accomplished in the provision of a flexible, generally elongate strap having two oppositely facing sides, the first side having first hook and loop securement means and the second side having a frame engaging member and a second hook and loop securement means. An end projection of the balloon is positioned within the bight of a reversely bent end of the frame member engaging member of the strap. The reversely bent end is then compressed against the frame member and the strap is wrapped around the frame member whereby the hook and loop securement means of the second side of the strap overlies the hook and loop securement means of the first side of the strap. Pressing of the respective hook and loop means of the strap together firmly secures the end projection of the balloon to the frame member of the bicycle. Because the frame member engaging member of the strap is thereby held in intimate contact with the frame member, the end of the balloon is firmly held to the frame and is prevented from relative movement with respect thereto.

BRIEF DESCRIPTION OF THE DRAWINGS

The foregoing and other novel features of the present invention will be better understood by a reading of the following detailed description taken in connection with the accompanying drawings wherein.

DETAILED DESCRIPTION OF THE PREFERRED EMBODIMENT

Figure 1:
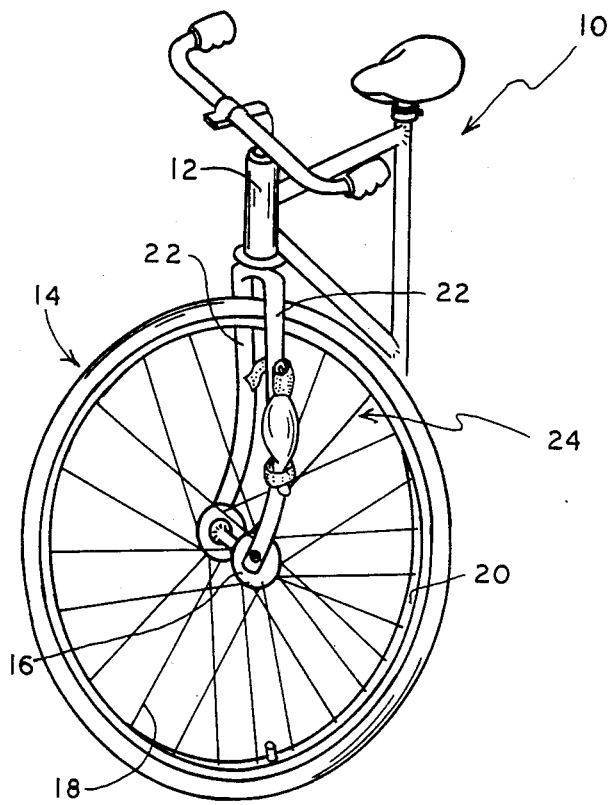
FIG. 1 is a fragmentary perspective view of a bicycle having a balloon-type noise maker installed thereon in accordance with the principles of the invention.

Referring now to the drawings, and initially to FIG. 1, a typical bicycle, designated generally by the reference numeral 10 is illustrated as including a structural frame assembly 12 to which a wheel 14 is mounted. The wheel 14 is of a type including a central hub member 16 having a plurality of spokes 18 extending radially outwardly therefrom and connected at their outermost ends to a rim 20. The frame 12 includes a pair of downwardly extending leg portions 22, 22 having their distal ends connected to the hub 16 of the wheel 14 by means of suitable bearings (not shown) thereby defining a fork within which the wheel 14 revolves. Attached to one of the leg members 22 at a position adjacent to the spokes 18 of the wheel 14 is a noise making assembly 24 constructed in accordance with the principles of the present invention and designated generally by the reference numeral 24.

Figure 2:
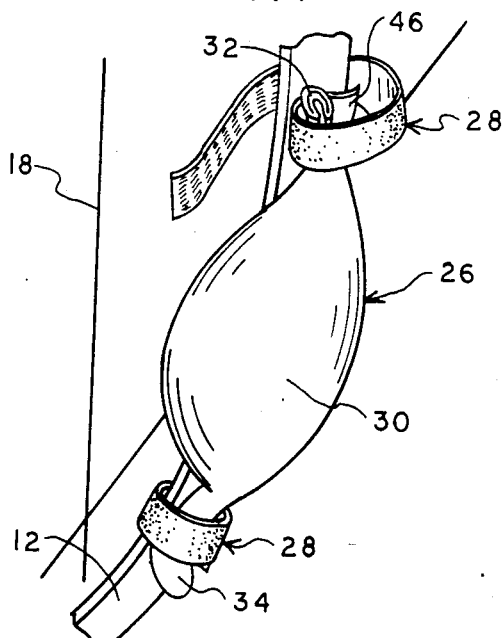
FIG. 2 is an enlarged fragmentary perspective view of the balloon type noise maker shown in FIG. 1, illustrating the manner in which the balloon is secured to the frame of a bicycle utilizing a strap device constructed in accordance with the principles of the invention.

As best seen in the enlarged view of FIG. 2, the noise making assembly 24 includes as its principle components a toy balloon 26 which is secured to the leg member 22 of the frame 12 by a pair of straps 28, 28. Preferably, the toy balloon 26 is of a type having a generally elongate central bulbous portion 30 with a necked-down nozzle portion 32 extending therefrom when the balloon 26 is inflated with air. In addition, it is desirable that the end of the balloon 26 opposite the nozzle portion 32 includes a nipple portion 34 extending therefrom when the balloon is in a partially inflated state. The nipple 34 and nozzle 32 thereby define a pair of projections which allow the balloon 26 to be conveniently gripped by the straps 28, 28 facilitating the attachment of the balloon 26 to the frame 12 of the bicycle 10.

Figure 3:
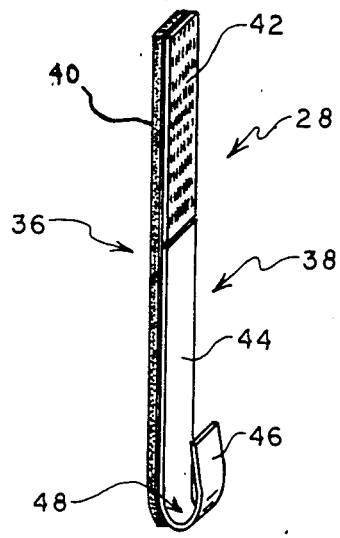
FIG. 3 is a perspective view of a strap device constructed in accordance with the principle of the invention.

In the perspective view of FIG. 3 the strap 28 of the instant invention is illustrated as being generally elongate in configuration and having an exterior side 36 and an interior side 38. The strap 28 is a composite member consisting of a first strip of material 40 preferably extending the entire length of the exterior side 36 thereof. Laminated to the first strip member 40 and extending along a first portion of the interior side 38 of the strap 28 is a second strip of material 42. The first strip of material 40 and second strip of material 42 are of a hook and loop type composition like the type of material sold under the trade name VELCRO, and thus are capable of acting as securement means when brought into contact with each other. In the embodiment illustrated, the first strip member 40 is shown as being the loop-type component of the hook and loop securement system while the second strip portion 42 is illustrated as being of hook-type material composition. However, it is not intended to limit the invention to the specific arrangement of hook and loop material illustrated. In this regard, the hook material and loop material can be reversed in disposition from the illustrated orientation without altering the functional characteristics of the strap 28. The strap 28 further comprises a band member 44 disposed in abutment with the second strip member 42 and laminated to the first strip member 40. The function of the band member 44 is to provide a non-slip surface for cooperation with the frame 12 of the bicycle in securing the balloon 26 thereto, and accordingly, this portion 44 is preferably composed of a rubber or rubber-like material demonstrating a relatively high coefficient of friction when applied to a metal surface. For purposes which will be explained hereinafter, in detail, the band member 44 also includes a tail portion 46 extending generally outwardly from the first strip member 40 and from the strap 28, in general. In the preferred embodiment, the tail portion 46 is pre-formed such that it is reversely bent with respect to the body of the band member 44 thereby defining a bight portion 48. The lamination of the various band members 40, 42 and 44 can be accomplished by any suitable means including cementing or sewing.

OPERATION

Figure 4:
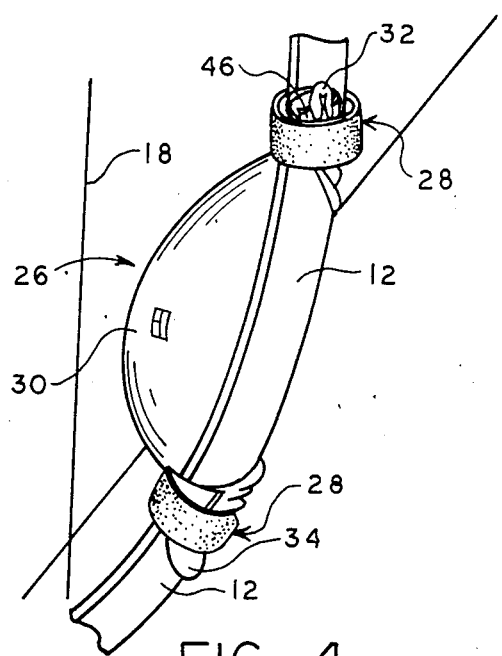
FIG. 4 is a perspective view similar to FIG. 2 illustrating a balloon as mounted to the frame of a bicycle but positioned in the noise making mode.

The operation of a noise making assembly 24 constructed in accordance with the principles of the invention can best be seen in the perspective view of FIG. 4, wherein a balloon 26 is illustrated as mounted to the frame 12 of the bicycle 10 by means of a pair of straps 28 which are wrapped around the nozzle 32 and nipple 34, respectively, of the balloon 26 thereby securing the balloon 26 to the frame 12. Once the balloon 26 has been so attached, the bulbous central portion 30 thereof may be manually twisted around the side of the frame 12 and urged into a position whereupon it occupies a space 50 defined between adjacent spokes 18 of the wheel 14. In such a disposition, the balloon 26 is trapped between the spokes 18 and upon revolution of the wheel 14 successive spokes 18 come in contact with, or strike, the bulbous central portion 30 of the balloon 26 thereby generating a loud, hollow sound which increases in intensity with an increase in the angular velocity of the wheel 14.

The process of mounting the balloon 26 to the frame 12 is initiated by first positioning either the nozzle 32 or nipple 34 within the bight portion 48 of the band member 44 and then compressing the tail portion 46 against the body of the band member 44 such that the nozzle 32 or nipple 34 is trapped therebetween. Then, the strap 28 is positioned on the frame member 12 at a suitable distance from the hub 16 of the wheel such that the interior side 38 of the strap 28 faces the frame member 12, whereupon the tail portion 46 of the band member 44 is manually compressed against the frame member 12. When so positioned, the strap 28 may then be manually wrapped around the frame 12 such that the second strip 42 of hook and loop material is brought into registry and overlies the first strip member 40. Upon compression of the first and second strip members 40 and 42, respectively, together, the strap becomes secured to the frame member 12 with the nozzle 32 or nipple 34, as the case may be, essentially sandwiched between the layers of the strap 28 and firmly secured to the frame member 12. The hook and loop material comprising the second strip member 42 of the strap 28 need only extend over a relatively small portion of the interior side 38 of the strap 28, and therefore, the band member 44 can be of sufficient length to extend completely around the frame member 12 thus providing a frame engaging surface which is non-slip in character. Accordingly, the strap 28 is prevented from relative movement with respect to the frame member 12 despite the imposition of forces acting on the balloon 26 which would tend to rotate the strap 28.

It can thus be appreciated that the strap 28 of the instant invention provides a simple, yet effective means for facilitating a bicycle noise making assembly of a highly desirably type. Since the strap 28 consists of only a few, easily assembled components, it can be manufactured with relatively little expense and thus can be made available for purchase at a highly favorable price. Moreover, the composite elements of the strap 28 are each of a soft, flexible composition, and hence, the strap 28 cannot cause damage to the bicycle 10 nor jam in the bicycle wheel 14 risking harm to the bicyclist. The soft, flexible nature of the straps also allows for secure attachment of the balloon without exposing the balloon to stress concentrations tending to reduce its service life. In addition, the installation of the strap 28 on the frame 12 of the bicycle is of such simplicity as to be readily performed by the youngest bicyclists who otherwise lack the manual dexterity to install the relatively complicated mechanisms heretofore known.

While the present invention has been described in connection with particular embodiments thereof, it will be understood by those in the art that many changes and modifications may be made without departing from the true spirit and scope of the present invention. Therefore, it is intended by the appended claims to cover all such changes and modifications which come within the true spirit and scope of this invention.

What is claimed as new and desired to be secured under Letters Patent of the United States is:

1. A device for securing a balloon to a frame member of a bicycle having at least one wheel supported by spokes attached to said frame member, comprising:
   a flexible, generally elongate strap having two oppositely facing sides;
   one side of said strap comprising first hook and loop securement means;
   the second side of said strap having a securement portion and a frame engaging portion;
   said securement portion including second hook and loop securement means for cooperation with said first hook and loop securement means to secure said strap to said frame member;
   said frame engaging portion including a flexible, generally elongate band member;
   said band member being adapted for non-slip engagement with said frame member; and
   means cooperating with said band member for mounting said balloon at opposite ends thereof to said frame member and providing adjustable placement of said balloon toward and away from said spokes wherein said balloon is engaged by said spokes when said balloon is placed toward said spokes so that rotational movement of said wheel produces a given motor-type sound and wherein said means cooperating with said band member includes a reverse bent terminal end portion of said band member which grips an end portion of said balloon and which is compressed against said frame member by said frame engaging portion of said strap.

2. A device for securing a balloon to a frame member of a bicycle comprising:
   a flexible, generally elongate strip having two oppositely facing sides;
   one side of said strap comprising first hook and loop securement means;
   the second side of said strap having a securement portion and a frame engaging portion;
   said securement portion including second hook and loop securement means for cooperation with said first hook and loop securement means to secure said strap to said frame member;
   said frame engaging portion including a flexible, generally elongate band member;
   said band member being adapted for non-slip engagement with said frame member;
   wherein said band member includes a terminal end portion extending generally outwardly of said strap; and
   wherein said terminal end portion is reversely bent with respect to said band member defining means for gripping an end portion of said balloon.

3. A method for securing a balloon to a frame member of a bicycle, the balloon having a bulbous central portion with a pair of projections at opposite ends thereof, comprising:
   providing a flexible, generally elongate strap having two oppositely facing sides, a first side comprising first hook and loop securement means and the second side having a frame engaging member and second hook and loop securement means, said frame engaging member having a reversely bent terminal end portion extending generally outwardly of said strap; positioning an end projection of said balloon within the bight of the reversely bent end of said frame engaging member of said strap;
   compressing said reversely bent end against said frame member;
   wrapping said strap around said frame member with said frame engaging member facing said frame member whereby said first and second hook and loop securement means overlie one another;
   pressing said first and second hook and loop securement means together whereby said end projection of said balloon is secured to said frame member.

4. A simulated motor-sound producer for attachment to a frame member of a bicycle comprising in combination
   a balloon having first and second end portions;
   first and second flexible, generally elongate straps each having two oppositely facing sides;
   one side of each of said straps comprising first lock and loop securement means;
   the second side of each of said straps having a securement portion and a frame engaging portion;
   said securement portions including second hook and loop securement means for cooperation with said first hook and loop securement means to secure said strap to said frame member;
   said frame engaging portions including a flexible, generally elongate band member;
   said band members being adapted for non-slip engagement with said frame member to secure said balloon thereto; and
   wherein each band member includes a reverse bent terminal end portion which surrounds and entraps a respective end portion of said balloon and wherein the balance of each of said straps is adapted to be wrapped around the entrapped balloon end portion and said frame member.

* * * * *